United States Patent [19]

Traver et al.

[11] Patent Number: 5,360,852
[45] Date of Patent: * Nov. 1, 1994

[54] SILICONE ADHESIVE AND ORGANIC ADHESIVE COMPOSITES

[75] Inventors: Frank J. Traver, Troy; Duane F. Merrill, Ballston Spa, both of N.Y.

[73] Assignee: General Electric Company, Waterford, N.Y.

[*] Notice: The portion of the term of this patent subsequent to Jul. 7, 2009 has been disclaimed.

[21] Appl. No.: 63,349

[22] Filed: May 18, 1993

Related U.S. Application Data

[60] Continuation of Ser. No. 797,487, Nov. 22, 1991, abandoned, which is a division of Ser. No. 265,192, Oct. 31, 1988, Pat. No. 5,128,394, which is a continuation of Ser. No. 647,369, May 6, 1987, abandoned.

[51] Int. Cl.$^5$ .................................................. C08K 5/54
[52] U.S. Cl. ............................... 524/268; 524/110; 524/269; 524/506
[58] Field of Search ............... 524/110, 268, 269, 506

[56] References Cited

U.S. PATENT DOCUMENTS 2,723,966 11/1955 Youngs ............................... 525/474
2,857,356 10/1958 Goodwin ............................ 524/267

FOREIGN PATENT DOCUMENTS 2354759 5/1974 Germany ............................. 524/96

Primary Examiner—Joseph L. Schofer
Assistant Examiner—Peter D. Mulcahy

[57] ABSTRACT

Organic pressure-sensitive adhesive and silicone pressure-sensitive adhesive composites have improved shear strength upon the addition of a silicone cross-linking agent.

15 Claims, No Drawings

SILICONE ADHESIVE AND ORGANIC ADHESIVE COMPOSITES

This is a continuation of of copending application(s), Ser. No. 07/797,487 filed on Nov. 22, 1991, now abandoned, which is a division of Ser. No. 07/265,192 filed on Oct. 31, 1988, now U.S. Pat. No. 5,128,394, which is a continuation of Ser. No. 07/647,369 filed Aug. 6, 1987 and now abandoned.

The present invention relates to pressure-sensitive adhesives. More particularly, the present invention relates to pressure sensitive adhesives which are an interpenetrating network of silicone adhesives and organic adhesives.

BACKGROUND OF THE INVENTION

Organic pressure-sensitive adhesives have been finding increased utility principally to manufacture pressure sensitive adhesive tapes. For a variety of common uses, pressure-sensitive adhesive tapes manufactured with organic pressure-sensitive adhesives, have the requisite physical properties and low cost to make them very much in demand.

However, there are many uses for which pressure-sensitive tapes manufactured from organic pressure-sensitive adhesives are unsuitable. For example, organic pressure-sensitive adhesive tapes do not weather well. Such tapes have poor adhesion to low energy surfaces. These tapes have poor low temperature flexibility, and they have poor high temperature stability. Thus, organic pressure-sensitive adhesive tapes are generally unsuitable for use in outside graphics, such as striping on automobiles or graphics in windows; for use in bonding plastics and for use in conditions where temperature extremes are encountered.

Silicone pressure-sensitive adhesives are also well known adhesives and are widely employed in a variety of uses, including pressure-sensitive adhesive tape. Silicone pressure-sensitive adhesives exhibit excellent adhesion to very low energy surfaces, have excellent weatherability, are flexible at low temperature and are chemically stable at very high temperature. However, the principal drawback to a much wider spread use of silicone pressure-sensitive adhesives is cost.

Thus, the present day market in pressure-sensitive adhesives is split between high performance but costly silicone pressure-sensitive adhesives and organic pressure-sensitive adhesives which are cost effective for most uses. Of course, methods are known to obtain pressure-sensitive adhesives which have intermediate physical propterties as well as intermediate price.

One such method involves blending a solution of silicone pressure-sensitive adhesive and a solution of organic pressure-sensitive adhesive and applying the blend to a tape from solution. Another method disclosed in assignee's Ser. No. 047,837, filed herewith now U.S. Pat. No. 4,791,163 and hereby incorporated by reference, involves forming an emulsion of silicone pressure-sensitive adhesive and organic pressure-sensitive adhesive in water and applying the mixture to a tape from emulsion.

Although adhesives applied by these methods have substantially improved properties over organic adhesives, still certain properties can be further improved. For example, the shear strength of these adhesives is very poor, particularly under heat. This aspect is generally a feature of organic adhesives and is carried over into the organic/silicone adhesive composites.

It is an object of the present invention to manufacture silicone and organic pressure-sensitive adhesive composites with improved shear strength.

DESCRIPTION OF THE INVENTION

Briefly, there is produced by the present invention an emulsion or solution comprising:
(a) 100 parts by weight of water or organic solvent;
(b) from about 10 to about 400 parts by weight of pressure-sensitive adhesive comprising:
  (i) from about 50 to about 99% by weight organic pressure-sensitive adhesive, and
  (ii) from about 1 to about 50% by weight of silicone pressure-sensitive adhesive; and
(c) an effective amount of silicone cross-linking agent to increase shear strength of the composite adhesive.

Organic pressure-sensitive adhesives for use herein may be applied with hand pressure and will stick aggressively to most common surfaces. Generally organic pressure-sensitive adhesives are manufactured from a base elastomer rubber which is either natural or synthetic. Base rubbers for organic pressure sensitive adhesives include milled natural rubber, reclaimed rubber, styrene-butadiene rubber, butyl rubber, butadiene-acrylonitrile rubber, polyvinyl ether rubbers, polyacrylate ester rubber, styrene-butadiene-styrene rubber, styrene-isoprene-styrene rubber, etc.

To manufacture a pressure sensitive adhesive, the base rubber is compounded with other base rubbers and with additives which have a variety of functions. Tackifiers improve the surface wetting or tack of the adhesive to a variety of substrates. Plasticizers, fillers, and antioxidants are added for their art known purposes.

Preferred as the pressure sensitive adhesive herein are the acrylate pressure sensitive adhesives which are normally a copolymer of a higher alkyl acrylate such as 2-ethyl hexyl acrylate copolymerized with a small amount of a polar comonomer. Suitable comonomers include acrylic acid, acrylamide, maleic anhydride, diacetone acrylamide, and long chain alkyl acrylamides. Suitable pressure-sensitive acrylic adhesives are described in U.S. Pat. Nos. Re No. 24,906; 3,558,574; 3,535,293; and 3,299,010, hereby incorporated by reference.

Silicone pressure-sensitive adhesives suitable for use herein are well known in the art. In brief, these adhesives contain a mixture of silicone resins and silicone fluids. The silicone resins are generally referred to as MQ resins which contain M units, represented by the formula $R_3SiO_{1/2}$, and Q units, represented by the formula $SiO_{4/2}$, where R is a monovalent hydrocarbon radical. Generally, such resins contain 1 to 2 Q units for each M unit. The silicone fluids are linear, high viscosity organopolysiloxane fluids having a viscosity between about 50,000 and 3,000,000 centipoise and containing terminal silicon-bonded hydroxyl groups used for co-reacting with the above described MQ resins.

These silicone pressure-sensitive adhesives are blended and cured by reacting the resins with the fluids in a condensation reactor. Typically, for each part by weight of resin, there is added from 0.5 to 6 parts by weight fluid.

Silicone cross-linking agents for use herein include the organic peroxides and alkoxy silanes. The use of either cross-linking agent will increase the cross-link density of the silicone adhesive and as seen herein, the shear strength of the adhesive composite.

Suitable peroxide cross-linking agents include diaroyl peroxides, such as dibenzoyl peroxide, di-p-chlorobenzoyl peroxide, and bis-2,4-dichlorobenzoyl peroxide; dialkyl peroxides such as di-t-butyl peroxide and 2,5-dimethyl-2,5-di-(t-butylperoxy)-hexane; diaralkyl peroxides such as dicumyl peroxide; alkyl aralkyl peroxides such as t-butyl cumyl peroxide, and 1,4-bis(t-butyl-peroxyisopropyl)-benzene; alkyl aroyl and alkyl acyl peroxide such as t-butyl perbenzoate, t-butyl peracetate, and t-butyl peroctoate; and other peroxides such as peroxy siloxanes and peroxy carbonates. Suitable peroxides and the methods of use are disclosed in U.S. Pat. Nos. 2,448,565; 2,723,966; and 2,480,620.

Of course, the silicone pressure-sensitive adhesive phase should not be cross-linked beyond the point where it is no longer tacky on the surface. Thus, persons skilled in the art must adjust the amount of peroxide cross-linking agent utilized, the heat of peroxide cure, the shear strength desired, and the resultant tack. Generally, from about 0.1 to about 3% by weight of peroxide based on silicone may be used.

Suitable alkoxy silane cross-linking agents are well known in the art and cross-link the silicone pressure-sensitive adhesive through a condensation reaction with Si—OH end groups. The preferred cross-linking agents are methoxy- and ethoxysilanes such as methyltrimethoxy silane, ethyl silicate, gamma-aminopropyltrimethoxy silane, triethoxy silane, etc. The alkoxy cross-linking agents require a cross-linking catalyst such as amines or carboxylic acid salts of metals including Pb, Zn, Zr, Sb, Fe, Cd, Sn, Ba, Ca, and Mn, particularly the naphtenates, octoates, hexoates, laurates, and acetates thereof. Tin (II) octoate and dibutyltin dilaurate are particularly satisfactory. Amine substituted cross-linking agents such as gamma-aminopropyltrimethoxy silane are self-catalyzing.

Again, as above, the silicone pressure-sensitive adhesive must not be cross-linked past the point where there is no longer tack. Generally, the alkoxy silane cross-linking agent is employed in amounts ranging from about 1 to about 10% by weight based on the silicone pressure-sensitive adhesive. The metal cross-linking catalyst should be present in amounts ranging from about 1 to about 1000 weight parts per one million parts by weight of silicone pressure-sensitive adhesive and acrylic pressure-sensitive adhesive.

As manufactured, the silicone adhesive material must be carried in a non-polar solvent. Thus, to handle the silicone adhesive, there is required at least about 1 part by weight non-polar solvent for 10 parts by weight silicone adhesive. Suitable non-polar solvents include toluene, xylene, etc. Preferably there is used from 2 to about 9 parts by non-polar solvent for each 10 parts by weight silicone adhesive.

Suitable silicone pressure-sensitive adhesives are described in detail in U.S. Pat. No. 2,857,356 to Goodwin; U.S. Pat. No. 2,736,721, to Dexter; and U.S. Pat. No. 2,814,601 to Cuttle, et al. All of these patents are incorporated herein by reference.

The silicone adhesive and organic adhesive composite may be applied from either solution or emulsion. Emulsions contain micelles of organic pressure-sensitive adhesive and micelles of silicone pressure-sensitive adhesive in a continuous water phase. Solutions have an organic solvent suitable to dissolve both the organic and pressure-sensitive adhesives.

In the case of adhesive application from emulsion, an emulsifying agent or agents is generally required to maintain both the micelles of silicone adhesive and micelles of organic adhesive in a substantially stable state of suspension. For use herein, the emulsion must be stable even at low water content so that drying of the adhesive coat may be accomplished prior to phase separation of the silicone adhesive and the organic adhesive. Thus, to determine whether any given emulsifying agent is suitable for use herein, persons skilled in the art must determine (1) whether a stable emulsion of silicone adhesive and organic adhesive in water is obtained, and (2) whether the emulsion is maintained far enough into the drying step that phase separation does not occur during drying. If the emulsion breaks too soon in the drying process, phase separation of the silicone adhesive and organic adhesive will form two layers of adhesive rather than an interpenetrating network. Persons skilled in the art can easily test emulsifying agents and emulsions.

Specific emulsifying agents and amounts utilized will vary depending on circumstance. Suitable emulsifying agents include both ionic and nonionic agents. These agents may have an HLB number ranging from 1 to 40 but generally the HLB number will run from about 6 to about 20. It is preferred that emulsifying agent be effective in the range of from about ½ to about 3 parts by weight for each 100 parts by weight water. Suitable emulsifying agents and the use are more fully described in the Encyclopedia of Chemical Technology, vol. 8, pages 900–930, John Wiley and Sons, 1979.

In emulsions of silicone adhesive with styrene-butadiene rubber, primary or secondary amine salts of organic acids have been found effective as emulsifying agents. The organic acids should have from about 2 to about 30 carbon atoms in the backbone and may be unsaturated. Suitable acids include butyric acid, caproic acid, lauric acid, etc. The preferred organic acid is undecylenic acid. The primary or secondary amine includes aliphatic amines, substituted aliphatic amines, unsaturated organic amines, cycloaliphatic amines, substituted cycloaliphatic amines, unsaturated cyclo-organic amines, etc. A preferred amine is morpholine.

In emulsions of silicone adhesives with acrylic adhesives, ethoxylates have been found suitable as the emulsifying agent. Suitable ethoxylates include those of the general formula:

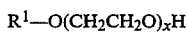

where x ranges from about 1 to 20 and $R^1$ is an alkyl or aryl group. Preferred R groups are aryl and include p-methyl phenyl, phenyl, p-ethyl phenyl, p-octyl phenyl, etc.

The emulsion herein may be prepared by known methods. For example, the silicone in water emulsion and acrylic in water emulsion may be prepared separately and combined or the emulsions may be prepared simultaneously in a single batch. Preparation of the emulsion should be such to result in an adhesive micelle size ranging from about ¼ to about 3 microns in diameter. Micelle size should average about 1 micron.

Solution application of the silicone and organic adhesive composite is more straight forward requiring only an organic solvent that is capable of dissolving both the organic and silicone adhesives. Such solvents are preferably non-polar and include toluene, dimethyl ether, xylene, etc. Aromatic solvents are preferred.

The solvent should not have such a low vapor pressure that it is difficult to remove from the adhesive in a drying process. If the solvent is too difficult to remove then phase separation between the silicone adhesive and organic adhesive may occur following precipitation but prior to complete solvent removal.

Adhesive emulsions or solutions for application to a substrate generally contain from about 10 to about 400 parts by weight of adhesive solids, i.e. micelles of adhesive or solute, for each 100 parts by weight water or organic solvent. Preferably, the solids should range from about 15 to about 200 parts and more preferably from about 20 to about 100 parts by weight for each 100 parts by weight of water or organic solvent.

Of the adhesive solids, the silicone pressure-sensitive adhesive should comprise from about 1 to about 50% by weight with the organic pressure-sensitive adhesive making up the corresponding 50 to 99%. Preferably, the silicone adhesive should comprise from about 3 to about 30% by weight of the adhesive solids with the balance, 70 to 97%, being organic adhesive.

The adhesive emulsion or solution, once formed is simply applied to a substrate and dried by known methods. As above, drying the emulsion should be performed as quickly as possible to minimize the time in which the emulsion may break and phase separate.

Following application and drying of the silicone adhesive and organic adhesive composite, the silicone adhesive is cross-linked. Where an alkoxysilane is utilized as the cross-linking agent, cross-linking will occur by simply exposing the composite to atmospheric moisture. Heating may be used to speed the cure. However, where a peroxide cross-linking agent is utilized, then a heat cure is necessary. Thus, the composite must be exposed to temperatures ranging from about 80° to about 200° C., for times varying between about 5 minutes to about 1 hour. Persons skilled in the art are readily familiar with cross-linking these systems.

The adhesive solution or emulsion may be applied to a variety of substrates according to the skill of the art. To manufacture a tape, the common solution or emulsion is applied as a film on the surface of common substrates including paper, teflon, polyester, etc.

In order to enable persons skilled in the art to practice the present invention. The following examples are offered by way of illustration and not by way of limitation. All parts are in parts by weight.

EXAMPLES

Example 1

Prepared an emulsion by blending 1925 grams of 60% solids in toluene silicone adhesive, a 68/60 weight ratio of MQ resin/silicone fluid, with 825 grams odorless mineral spirits. Once the blend is uniform there was added 154 grams octylphenoxy polyethoxy ethanol, Triton X-114, and 66 grams octylphenoxy polyethoxy ethanol, in a stainless steel beaker equipped with hot plate {for heat), thermometer and air stirrer. After the material was blended, a blend of 1210 grams of water and 3.0 grams biocide was slowly added. The emulsion partially inverts (turns milky}. This premix was then milled through a Manton Gaulin colloid mill {5 mil gap and 10 psig pressure) into an additional 1317 grams water and blended.

| Solids: | 24.9% |
|---|---|
| Viscosity | 120 cps |

| Centrifuge stability | | |
|---|---|---|
| U6: | Top: | 1 cc oil |
| | Bottom: | 6.0 cc water |

Example 2

To 100 grams of acrylic emulsion there was added 10.45 grams of silicone emulsion from Example 1. The resulting mixture contained 5% silicone PSA based on total solids. A 10% and 30% silicone mixture was also made, The mixtures were found to be completely compatible. A 4 rail wet coating of the mixtures was applied to 2 mil mylar film and dried for 2 minutes at 95° C. followed by 2 minutes at 165° C. One inch wide strips of the coated mylar were placed adhesive side down on silicone release coated super calendered kraft paper. Following a 20 minute dwell time the adhesive coated mylar was separated from the release coated paper at a 180° C. angle at 12 inches per minute using a Scott Tester.

| % Silicone | Adhesion to Silicone Coated Paper |
|---|---|
| 0% | 5 grams per inch width |
| 5% | 80 grams per inch width |
| 10% | 95 grams per inch width |
| 30% | 305 grams per inch width |

Example 3

The mixtures of silicone and acrylic emulsions shown in Example 2 were tested for shear resistance at 70° C. In this case, the shear resistance test was conducted by overlapping and bonding two strips of one inch wide tape, adhesive face to adhesive face, for a distance of one inch. One end was suspended from a fixed bar and from the other end was hung a two hundred gram weight. The apparatus was placed in a 70° C. oven. It was found that the mixture dried on mylar has no shear resistance at 70° C.

Example 4

The mixture of silicone and acrylic emulsions shown in Example 2 were catalyzed with 2% benzoyl peroxide based on the silicone solids part of the mixture only. The catalyzed mixtures were applied to mylar and dried as shown in Example 3. The dried adhesive was tested for shear resistance at 70° C. There was no shear failure after 600 hours.

What is claimed is:

1. A method for controlling the release properties of an organic pressure-sensitive adhesive comprising: adding to the adhesive an additive comprising
    (i) a silicone pressure-sensitive adhesive,
    (ii) a silicone cross-linking agent, and
    (iii) a compatibilizing agent selected from the group consisting of an emulsifying agent compatible with both the silicone pressure-sensitive adhesive and the organic pressure-sensitive adhesive and a solvent capable of dissolving both the silicone pressure-sensitive adhesive and the organic pressure-sensitive adhesive.

2. The method of claim 1 wherein said silicone pressure-sensitive adhesive is a mixture of silicone resin and silicone fluid.

3. The method of claim 1 wherein said silicone cross-linking agent is selected from peroxide cross-linking agents.

4. The method of claim 3 wherein said silicone cross-linking agent is selected from the group consisting of diaroyl peroxides, dialkyl peroxides, alkyl aralkyl peroxides, alkyl aroyl peroxide and alkyl acyl peroxide.

5. The method of claim 3 wherein said peroxide cross-linking agent is present in an amount ranging from about 0.1 to about 3% by weight based on silicone pressure-sensitive adhesive content.

6. The method of claim 1 wherein said silicone cross-linking agent is selected from alkoxy silane cross-linking agents with a cross-linking catalyst.

7. The method of claim 6 wherein said silicone cross-linking agent is selected from the group consisting of methyltrimethoxy silane, gamma-aminopropyltrimethoxy silane and triethoxy silane.

8. The method of claim 6 wherein said alkoxy silane cross-linking agent is present in an amount ranging about about 1 to about 10% by weight based on silicone pressure-sensitive adhesive content.

9. The method of claim 1 wherein said organic pressure-sensitive adhesive is selected from the group consisting of milled natural rubber, styrene-butadiene rubber, butyl rubber, butadiene-acrylonitrile rubber, polyvinyl ether rubber, polyacrylate ester rubber and said emulsifying agent is a primary or secondary amine salt of an organic acid.

10. The method of claim 9 wherein said primary or secondary amine salt of an organic acid is the morpholine salt of undecylenic acid.

11. The method of claim 1 wherein said organic pressure-sensitive adhesive is an acrylic rubber and said emulsifying agent is an ethoxylate.

12. The method of claim 11 wherein said ethoxylate is an aryl ethoxylate.

13. The method of claim 1 wherein the compatibilizing agent is a solvent.

14. The method of claim 1 further comprising applying the adhesive to a substrate.

15. The method of claim 14 further comprising drying the adhesive.

* * * * *